Aug. 13, 1957 J. B. BEACH 2,802,398
AIRCRAFT ROCKET LAUNCHER

Filed Jan. 16, 1951 5 Sheets-Sheet 1

INVENTOR.
JAMES B. BEACH
BY
*George A. Sullivan*
Agent

Aug. 13, 1957     J. B. BEACH     2,802,398
AIRCRAFT ROCKET LAUNCHER Filed Jan. 16, 1951     5 Sheets-Sheet 2

INVENTOR.
JAMES B. BEACH
BY
George C. Sullivan
Agent

Aug. 13, 1957 J. B. BEACH 2,802,398
AIRCRAFT ROCKET LAUNCHER
Filed Jan. 16, 1951 5 Sheets-Sheet 3

INVENTOR.
JAMES B. BEACH
BY
George C. Sullivan
Agent

Aug. 13, 1957  J. B. BEACH  2,802,398
AIRCRAFT ROCKET LAUNCHER
Filed Jan. 16, 1951  5 Sheets-Sheet 5

INVENTOR.
JAMES B. BEACH
BY
Agent

United States Patent Office 2,802,398
Patented Aug. 13, 1957

2,802,398

AIRCRAFT ROCKET LAUNCHER

James B. Beach, Van Nuys, Calif., assignor to Lockheed Aircraft Corporation, Los Angeles, Calif.

Application January 16, 1951, Serial No. 206,218

11 Claims. (Cl. 89—1.7)

This invention relates to an improved multiple rocket firing arrangement especially suitable for installation in fighter or intercepter aircraft, and the like, where it is desired to fire multiple salvos of rockets in nearly simultaneous bursts, in order to bracket the desired target.

Rockets for air-to-ground or air-to-air combat have increasingly supplemented or replaced machine guns and cannon as offensive armament but the chief difficulties heretofore encountered have been in carrying enough rockets to provide repeated salvos, the necessity of firing sequential salvos with the shortest possible time delays, and the need of providing fin clearance between adjacent rockets in a single salvo.

My invention overcomes the foregoing limitations in a form adapted for use around the nose of a streamlined body of generally circular section, such as an airplane fuselage, nacelle, or wing tank, wherein the rockets are carried entirely within the envelope or skin line of an airplane fuselage, nacelle or wing tank. If the streamlined body is large enough the rocket launching tubes can be arranged as an annulus, leaving the central area or core free for the reception of other devices such as radar, radio, and other equipment.

It is accordingly an important object of my invention to provide for the rapid launching of successive salvos which together aggregate the maximum number of rockets that can be accommodated in a given envelope or skin outline. Rocket launching tubes closely adjacent each other should not be fired simultaneously because of possible fin interference, with resulting disturbance of the rocket trajectory, as the pivoted rocket fins open up as soon as the rockets leave their launching tubes, and therefore rockets fired simultaneously must be far enough apart to provide fin clearance. In order to obtain the maximum number of rockets in a single salvo, I propose to simultaneously fire adequately spaced rockets from a number of ports symmetrically spaced arranged around the area containing the rocket tubes, and then shift such ports to adjacent rocket tubes for the next salvo. By providing movable ports in superimposed shells arranged to align with each other for each salvo, I am enabled to close the rocket exit ports before and after firing the rockets, and also between salvos if less than the total number of rockets carried are to be fired in rapid sequence.

It is also an important object of this invention to provide a compact and concentrated arrangement of rocket launching tubes arranged within the skin line of an airplane fuselage nose or the like, the launching ends of said tubes being normally covered as a continuation of the skin line with arrangements to momentarily uncover at one time only those tubes from which a given salvo is to be fired.

Other objects and features of the invention will be readily understood from the following detailed description of a typical preferred form of the invention wherein reference will be made to the accompanying drawings in which:

Figure 9 is a diagram to illustrate the relative positions of the coaxial shutters, to assist in explaining the shutter operation;

Figure 1:
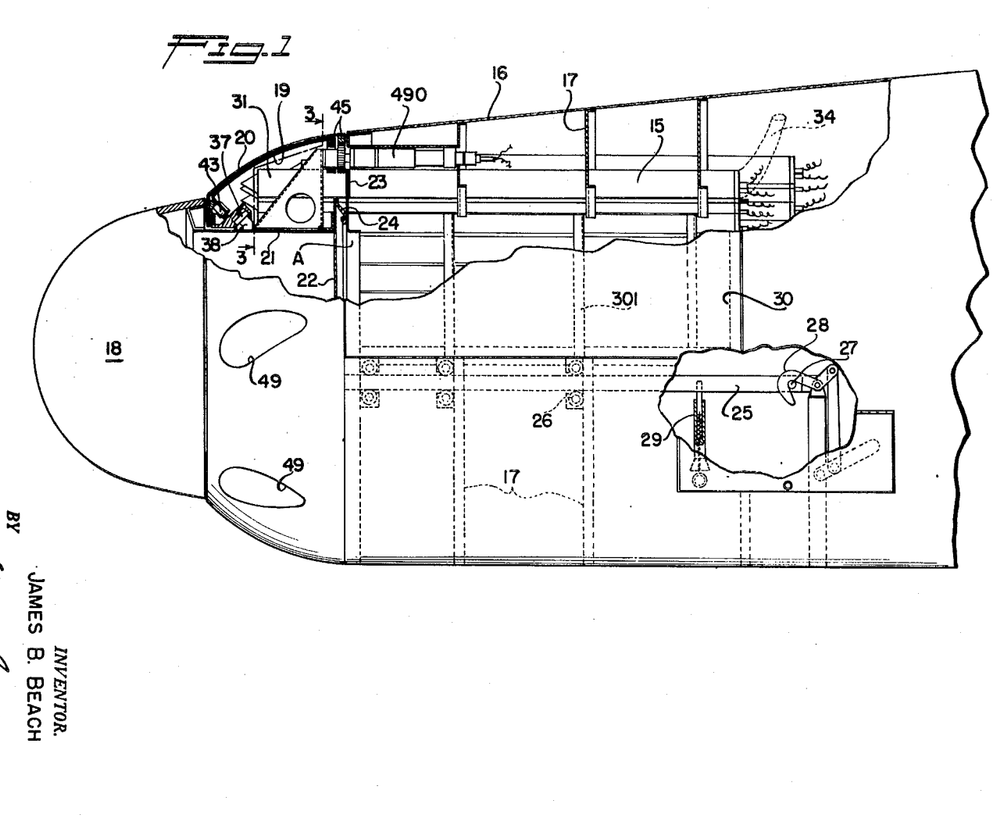
Figure 1 is a side view, partly broken away to show details, of an aircraft fuselage nose constructed in accordance with the teachings of this invention to incorporate two adjacent circular banks of rocket launching tubes together forming an annulus surrounding a nose radar dome, and providing space therebehind available for radar, radio, and other apparatus.
Figures 5, 6, 7:
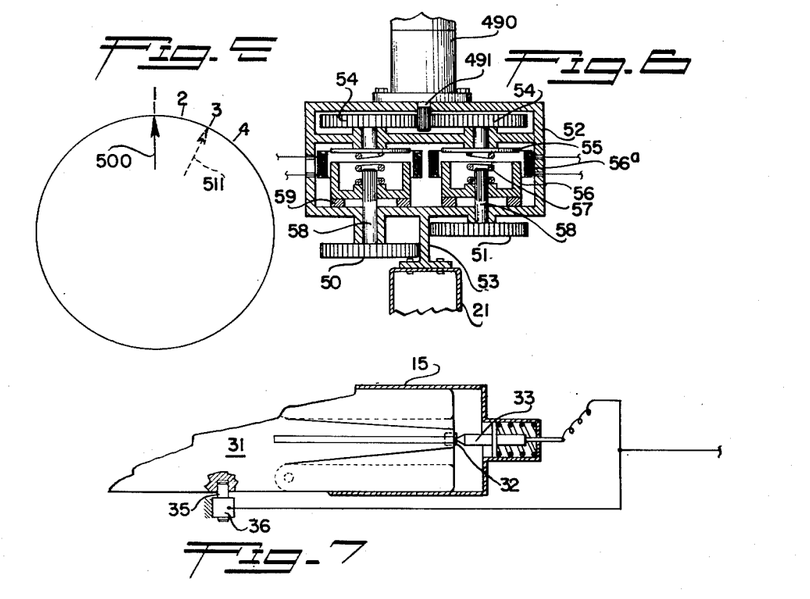
Figure 5 is an enlarged fragmentary detailed sectional view illustrating the shutter drive, and the front supports therefor.
Figure 6 is a fragmentary section taken on the line 6—6 of Figure 3 showing the drive and braking mechanism for the superimposed shutters.
Figure 7 is a detail of the rocket firing contact and detent mechanism.
Figure 10:
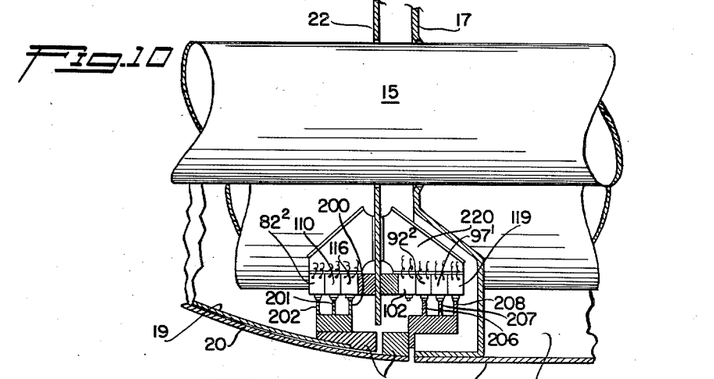
Figure 10 is an enlarged fragmentary sectional view illustrating the switch and cam arrangement for controlling the circuits, being taken substantially as indicated by line 10—10 on Figure 11.

I have chosen to illustrate my improved rocket launching arrangement installed in an airplane fuselage nose, wherein a double bank of rocket launching tubes 15 are arranged in an annular group within the airplane skin 16 and supported in several bulkhead rings 17. The annular space A inside the rings of tubes 15 is available for unrelated equipment normally carried by the airplane, and the forward continuation of this central area is occupied by a radar dome 18. Between the rear end of the dome 18, the outside diameter of which is small enough to clear the inner row of rocket tubes 15, and the forward end of the skin 16 of the airplane, two coaxial inner and outer and rotatable shutters 19 and 20 are mounted. The shutters 19 and 20 are annular members of curved transverse cross section being shaped and arranged to streamline between the dome 18 and skin 16, and to normally seal off the exit ends of the rocket tubes 15. As best illustrated in Figures 1, 5 and 10 the shutters 19 and 20 are closely nested and are free for relative rotation. The shutters 19 and 20 for the rocket tubes thus serve to "fair" or streamline what I will term an aircraft body which may be a fuselage, nacelle, tip tank, turret, or the like.

Figures 2, 3, 4:
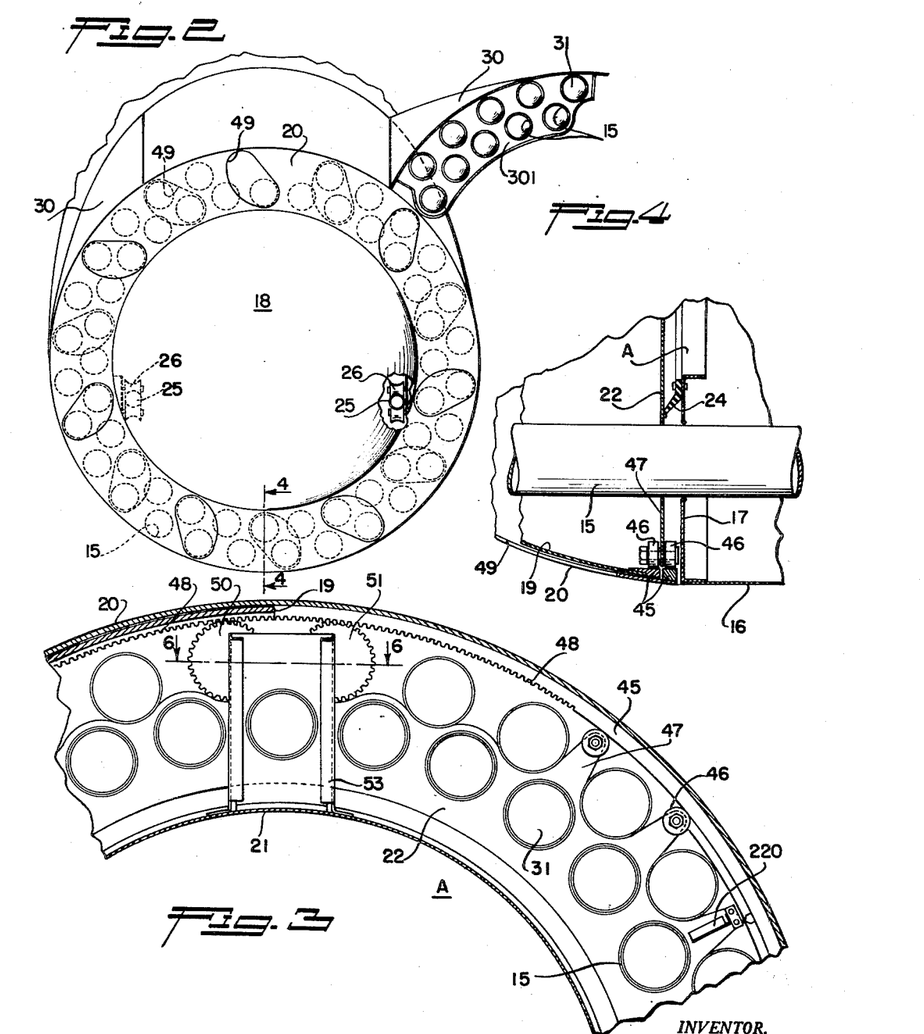
Figure 2 is a front view of Figure 1 also partly broken away to show a detail of the track arrangement supporting the nose and rocket tube shutter mechanism.
Figure 3 is an enlarged fragmentary view of the front end of the rocket launching tubes and the shutter drive arrangement taken on the line 3—3 of Figure 1.
Figure 4 is a fragmentary detail taken on the line 4—4 of Figure 2 showing the shutter supporting rollers and the seal between the removable nose and the fixed structure.
Figure 3:
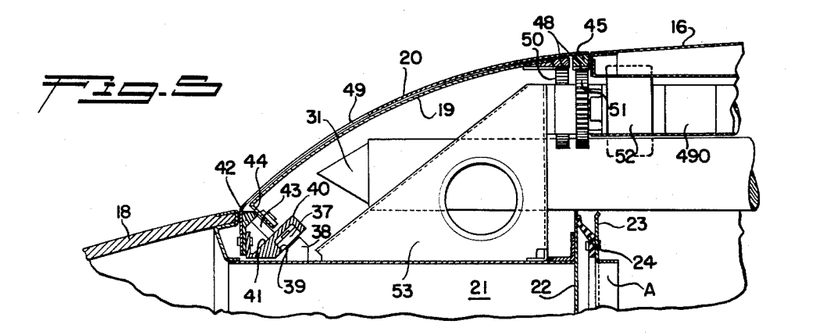

Details of the shutter mountings and shutter drive will be described hereinafter, it being desired at this point to bring out that the dome 18, shutters 19 and 20, their mountings and the shutter drive mechanism are carried by a drum-like structure 21 having a rear end plate 22; all of which are axially movable or removable as a unit. The front end of the skin 16 is supported by a bulkhead 23 parallel to the end plate 22. The bulkhead 23 carries an annular flexible seal 24 which engages the end plate 22. The drum-like structure 21 and its associated equipment are supported by a pair of parallel rods 25 each slidable between a plurality of pairs of supporting rollers 26 mounted on the bulkhead 23 and rings 17. The rear end of at least one rod 25 has a locking arrangement, comprising a pin 27 on the rod and a manually releasable and engageable hook 28 cooperating with the pin. A detent 29 is positioned to limit the normal range of forward motion of the drum 21, being engageable by the pin 27, to provide sufficient movement for access to the front end of the area A. The release of this detent 29 permits complete removal of the drum 21 and parts associated therewith. Further access to the area A may be had by providing doors 30 for the skin 16, as shown in Figure 2. The doors 30, which are hinged at each side of the structure to swing upwardly when opened, each carry a plurality of rocket tubes 15 which are thus made readily accessible. The doors 30 have bulkheads 301 which are offset from the stationary bulkheads 17 and which serve to carry the rocket tubes 15.

Each rocket tube 15 is arranged to receive air-to-air type folding-fin rockets 31 having central ignitor contacts 32 at their rear ends. Each tube 15 is provided at its rear end with a central spring pressed contact pin 33 to engage the rocket ignitor contact 32 of the related rocket 31. The rocket tubes 15 may be closed at their rear ends if desired, or may be vented through the skin 16 by individual ducts 34, one of which is shown in dotted lines in Figure 1. Use of such ducts 34 greatly reduces or eliminates the thrust or recoil effect familiar in guns, but the closed tubes build up pressure that helps to start and accelerate the rockets. A detent 35, schematically shown in Figure 7, serves to hold each rocket in its proper position, and is withdrawn by an electric solenoid 36 wired in series with the firing pin contact 33. These solenoids 36 and the detents operated thereby have been omitted from the other figures in order to avoid confusion, as they form no part of my invention.

The inner and outer shutters 19 and 20 are both guided and supported at their forward ends. A plurality of spaced inclined rollers 37 are mounted in brackets 38 attached to the drum 21, the rollers 37 running in tracks 39 in an annular member 40 attached to the front end of the outer shutter 20. Oppositely angled tracks 41 formed between the bracket member 40 and a filler member 42 attached thereto and to the outer shutter 20, receive spaced rollers 43 rotatably mounted on the inturned edge 44 of the inner shutter 19. Thus both shutters 19 and 20 are held against relative axial motion at their front ends. The rear end of each shutter is provided with a ring 45 which rides on a plurality of twin rollers 46 carried by ears 47 extending outwardly from the periphery of the drum and plate 22, as best shown in Figures 3 and 4. A portion of each ring 45 is provided with internal gear teeth 48 by which the shutters are partially rotated by a reversible driving mechanism to be later described.

Both shutters 19 and 20 are provided with a plurality of evenly spaced openings 49 each of which is adapted to uncover one rocket tube 15 in each row thereof, as best shown in Figure 2. In order to seal off all rocket tubes it is merely necessary to move or turn one shutter out of alignment with the other. Figure 9 diagrammatically illustrates this arrangement or relationship showing one hole position in the outer shutter 20 represented by the solid arrow 500 while the corresponding hole in the inner shutter 19 is indicated by the broken arrow 511. In order to open the shutters 19 and 20 for the first salvo it is then necessary only to rotate the inner shutter 19 and its arrow 511 to the number 1 position aligned with the arrow 500, in which case all the openings 49 in both shutters are in alignment for firing the first salvo of rockets. Both shutters 19 and 20 may then be shifted from position 1 to position 2 to fire the second salvo; to position 3 for the third salvo; and to position 4 for the last salvo. The spacing and number of the shutter openings 49 are preferably selected so that adjacent rockets in a given salvo do not develop fin interference when the rocket fins open out upon emerging from the rocket tubes. For this reason, the two rockets 31 simultaneously exposed through each of the aligned holes 49 are fired with a slight time delay sufficient to allow one rocket to clear the other.

The driving mechanism for coordinating the above described shutter movements comprises a reversing electric motor 490 driving a twin transmission ending in pinions 50 and 51 respectively meshing with the internal teeth 48 in the rings 45 which support the rear ends of the shutters 19 and 20. The pinions 50 and 51 replace two of the rocket tubes 15 in the outer row thereof. The twin transmissions are carried in a box 52 supported by a bracket 53 from the drum 21 and the motor 490 is in turn supported from the transmission case, so that the whole drive mechanism is removable as a unit with the drum 21, radar dome 18 and shutters 19 and 20. The transmission comprises clutch and brake mechanisms wherein gears 54 mesh with the motor pinion 491 and carry drive clutch plates 55. Axially aligned therewith are magnetic clutch members 56 operable by solenoids 56$^a$ and normally held disengaged from the plates 55 by springs 57. The members 56 are slidable on splined shafts 58 supporting the pinions 50 and 51. The ends of the members 56 opposite the clutching surfaces carry braking material 59 normally pressed against the transmission box 52 by the springs 57 to hold the shutters 19 and 20 stationary, and to quickly stop the shutters when the magnetic clutch circuits are broken at each desired time. These transmissions are primarily used to reduce the overrunning effect of the motor inertia, thus giving a very sensitive control wherein the magnetic clutches are energized for individual shutter movements. It will be noted that both transmissions can only be driven in the same direction at a given time, but that this does not interfere with or slow down the rocket firing sequence, as the motor 490 is first energized in one direction to bring the inner shutter holes 49 into alignment with those in the outer shutter 20, for the first salvo; then the motor is reversed to drive both shutters 19 and 20 in synchronization for the succeeding salvo positions. If only one salvo is to be fired, the shutters may be returned to the original closed position if desired.

Figure 8:
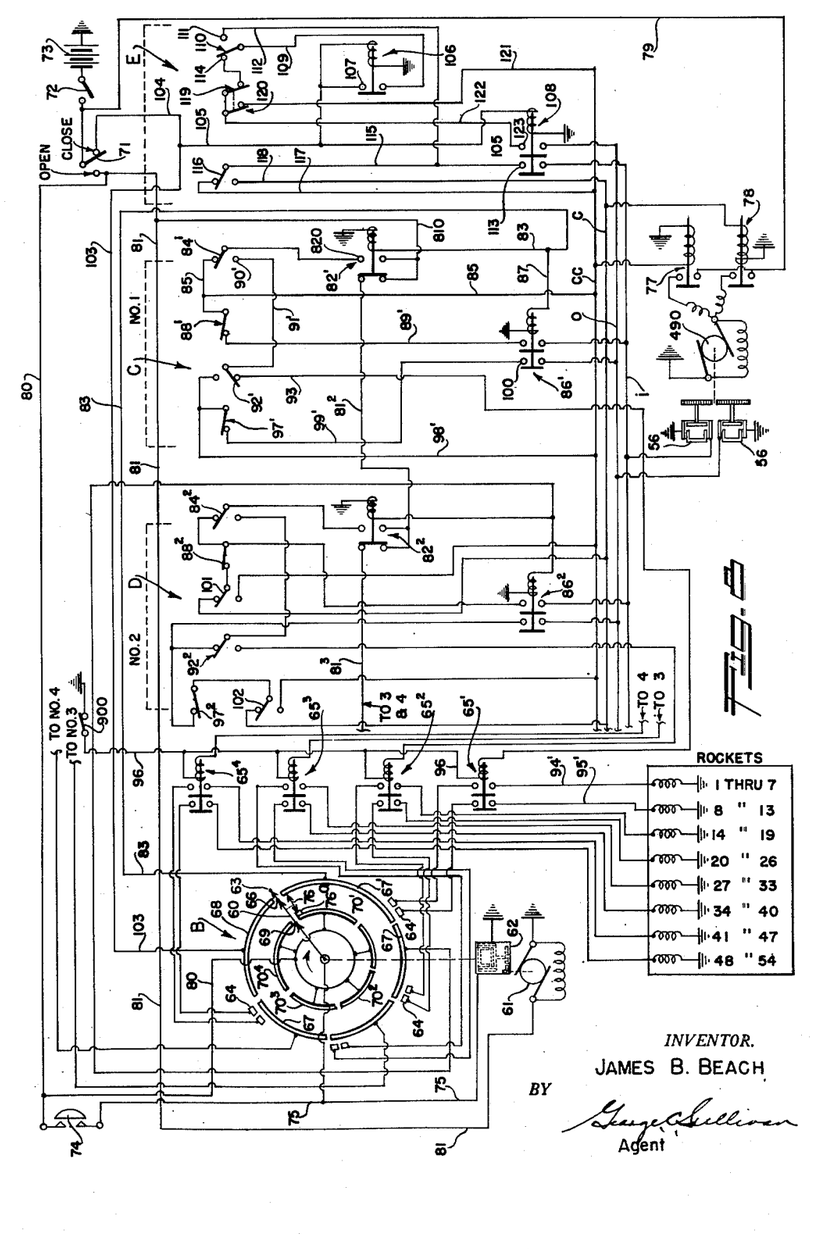
Figure 8 is a schematic wiring diagram of the circuits involved in shutter operation and rocket firing sequencing.

Control of shutter movements and rocket firing are electrically interlocked as schematically shown in the wiring diagram of Figure 8. An intervalvometer, generally indicated by the character B, has a contact arm 60 operated by a constant speed motor 61 when a solenoid or magnetic clutch 62 is energized. The clutch 62 may be identical with one clutch of the transmission described above; that is it includes a plate, a clutch member, a solenoid, a spring and braking material the same as the elements 55, 56, 56$^a$, 57 and 59 described above, the numeral 62 designating this combination of elements. The contact arm 60 carries several moving contacts, and these moving contacts separately engage separate spot and arcuate contacts disposed at different radii from the axis of the contact arm 60. The outermost contact 63 on the arm successively contacts four pairs of twin spot contacts 64 located around the outside periphery of the intervalvometer. These twin contacts are the rocket firing contacts which divide each salvo giving a momentary time delay between the rockets in the inner bank and in the outer bank, to avoid fin interference. The contacts 64 of each pair are connected to a related relay 65 operated by shutter operating circuits to be later described; the relay 65, when closed, firing the rockets then exposed in the shutter openings.

The specific disclosure herein provides for four rocket salvos, two of which have thirteen rockets 31 and the other two have fourteen rockets, at each firing position of the shutters. As a matter of convenience, since each of the shutter position circuits and the firing circuits are substantial duplicates the same reference numerals will be used for identical parts with superscripts indicating the specific shutter positions. In the wiring diagram only the first and second shutter position control circuits are shown, as the third is substantially identical with the second except for the physical position of the mechanically operated switches, and the fourth is substantially identical with the first with the same reservation. I have identified the first shutter control generally by the reference C wherein one half controls the inner shutter 19 and the other half controls the outer shutter 20. Similarly, the second position control is generally indicated by the reference D. Reference E applies to the shutter closing circuit generally.

The contact arm 60 carries a second contact 66 which makes contact with an outer series of arcuate contacts 67, one for each of the four shutter firing circuits, and a fifth, 68 for the shutter closing circuit E. A third and innermost contact 69 on the arm 60 makes contact with an inner series of arcuate contacts 70 which feed power to the contact arm 60 when energized upon closing a double throw arming switch 71 which starts the shutter opening and closing cycles. The arming switch 71 in turn is energized by a master switch 72 controlling the source of electrical energy, indicated by a battery 73. The intervalvometer motor 61 is connected electrically by wire 81 to the shutter opening contact or position of the arming switch 71, to be started thereby, and its solenoid clutch 62 can be energized by a firing button 74, also connected to the same side of the switch 71. The solenoid 62 is connected to both the firing button 74 and to the arm 60 by wires 75, and thus can also be energized through the arm by contact 69, segments 70, and line 80. The inner circle of segmental contacts 70 are also all connected to the shutter opening side of the switch 71 by line 80. The gaps between the contacts 70 are not aligned with the gaps in the outer segments 67 and thus break the shutter drive circuits for a pause during the firing of a given salvo. If the firing button 74 has not been pressed, the clutch solenoid 62 will be energized, but the inner shutter 19 will move counter-clockwise from the third position to the first position and remain there until the given salvo has been fired, or until the pilot has returned the switch 71 to its shutter closing position. It is possible to start the inner shutter 19 towards the first firing position prior to using the firing button 74 because the contact arm 60 carries a bridging contact 76, insulated from the arm 60, which contact makes momentary contact between a spot contact 76a on the inner arcuate segment 70′; whereby the intervalvometer is started by the circuit C.

Each of the four shutter position control circuits as well as the closing circuit E are connected to what may be called bus lines, identified as cc for counter-clockwise drive of the shutter by drive motor 490; c for clockwise rotation of the shutters; o for energizing the clutch member 56 for the outer shutter 20; and i for the clutch member for the inner shutter. These bus lines are live only when energized from one of the circuits generally indicated by E, C, D and the other two for shutter opening positions 3 and 4. The bus lines cc and c operate relays 77 and 78 respectively which close a circuit 79 from the battery, taken off the battery line beyond the master switch 72. Thus the motor circuit is set up by the master switch 72 but is not energized if the shutters 19 and 20 are in the closed position until the arming switch 71 is moved to the shutter opening position.

The opening position contact of the arming switch 71 is directly connected to both the firing button 74 and to the inner segments 70 of the intervalvometer by a wire 80. A branch lead 81 of the wire 80 extends to the motor 61 and has a lead 810 extending to the control circuit C for the first salvo shutter position wherein the outer shutter 20 is already in position and the inner shutter 19 must be moved counter-clockwise from position 3 to position 1. The lead 810 connects with the terminals at one side of a single pole double throw relay 82′. In the dead position of this relay 82′ one of the contacts at the other side of the relay is connected by a wire 81² to the opposite side of a duplicate relay 82² in the general circuit D, and wire 81³ extends therefrom to similar relays in general circuits controlling the third and fourth shutter positions (not shown to avoid duplication). Energization of relay 82′ is obtained from the intervalvometer segment 67′ by a wire 83. After relay 82′ is energized one pair of contacts 820 thereof are bridged to energize a double throw limit switch 84′ for the inner shell circuit. The switch 84′ in the position illustrated is connected by a wire 85 to the cc bus. At the same time as the relay 82′ is energized a double pole double throw relay 86′ is energized by a branch wire 87 from wire 83. One pair of contacts of the relay 86′ close a circuit through a single pole single throw limit switch 88′ and wire 89′ to energize the inner shutter clutch member 56. The result is that motor 490 starts to drive the inner shutter 19 in a counter-clockwise direction until the shutter reaches position #1, when the switch 84′ is shifted to its other contact 90′ and the switch 88′ is opened. With switch 84′ on contact 90′ a wire 91 connects it to an outer shutter single pole double throw switch 92′, which in position #1 of the outer shutter closes a circuit 93 leading to the double pole single throw relay 65′ which will complete rocket firing circuits 94′ and 95′ when the intervalvometer arm 60 reaches the twin contacts 64′. The switches 84′ and 88′ are operated by cam means described below. In order to be able to ground test these circuits the windings of the relays 65′, 65², 65³ and 65⁴ are provided with a common grounding circuit 96 controlled by a service safety switch 900, which is opened to break the relay circuits when it is desired to operate the shutters without firing the rockets.

Since the outer shutter 20 is already in position for the #1 salvo, its control circuit in general circuit C is then unenergized. However, a cam operated switch 97′ held open when the outer shutter is at position #1, closes when the shutter moves away from this position, to restore the outer shutter to its normal position #1 when circuit C is energized by connecting a wire 98′ from the cc bus to a wire 99′ to the outer clutch 56 through the contacts 100′ in relay 86′. The wire 99′ is also connected to wire 91′ through the switch 92′, when the latter is in its non-firing position, whereby a parallel circuit is established from the o bus to the inner shell position switch 84′ through contact 90′, wire 91′ and the upper terminals of the relay 82′ to wire 81 to correct the position of the outer shell should it have shifted out of alignment with position #1, as under such conditions the outer shutter clutch is energized through wire 99 and contacts 100 in relay 86′ to the o bus.

The circuit generally indicated by C, as just described, remains energized while the contact 69 rides on segment 70′ of the intervalvometer. When the contact 69 runs off of segment 70′ circuit C is deenergized by opening of relays 82′ and 86′. At this time the contact 63 on the arm 60 stops just short of the firing contacts 64′. Upon closing the firing button 74 the arm 60 will be started again to re-energize circuit C through the outer segment 67′ until the contact 66 reaches the gap at the end of segment 67′, whereupon the general circuit D for the second shutter position takes over.

The operation of circuit D for the second shutter position carries the arm 60 to the end of the inner segment 70², as described in connection with circuit C. In this case both shutters move from position #1 to position #2 before the second salvo of rockets can be fired by the button 74. The differences between the circuits reside in providing shutter misalignment-correcting single pole double throw switches 101 and 102 in series with the inner shutter position switch 88² and the outer shutter position switch 97²; the switches 101 and 102 being preferably of the snap-over type to determine which direction each shutter should turn to obtain correct alignment at the firing position.

In each general circuit, the switches 84, 88, 92, 97, 101 and 102 are positioned adjacent the shutters and mechanically operated thereby by cam means described below.

The third and fourth salvo circuits, as previously mentioned, are similar respectively to circuits D and C. After the firing of the fourth and last salvo, the outer segment 68 of the inter-valvometer energizes the general closing circuit E through the wire 103. This closing circuit can also be manually energized at will by moving the arming switch 71 to its closed position contact which is connected to wire 103 by wire 104; the operation of the circuit E being the same in either case. The junction of the wires 103 and 104 leads by wire 105 to a single pole single throw relay 106, energizing both the relay coil and one contact 107 thereof. The wire 105 also energizes the coil of a double pole single throw relay 108, so that both relays operate simultaneously.

Relay 106 closes a circuit 109 to a single pole double throw switch 110 for the inner shutter 19. When this shutter 19 is at other than position #3, contact 111 of switch 110 is connected by wire 112 to a contact 113 of relay 108 and thence to the inner clutch bus (*i*), this circuit being broken when the inner shutter reaches position #3 to move the switch 110 to its other contact 114. A branch wire 115 extends from 112 to a switch 116 which is of a snap-over character determined by which side of position #3 the inner shutter may be located. When the switch corresponds to a shutter position between #3 and #4 the switch 116 closes a circuit 117 to the *cc* bus; and when the switch is shifted the other way it closes a circuit 118 to the *c* bus. With this arrangement the inner shutter is shifted to position #3 before the outer shutter moves, in the event the two shutters must move in opposite directions, since the outer shutter closing motion is always counter-clockwise.

With the inner shutter at position #3 the switch 110 moves to its contact 114 which is connected to the terminal of a single pole single throw switch 119 controlled by the outer shutter and opened at position #1 thereof. This switch 119 is in series with a second switch 120, mechanically operated therewith, which switch 120 when closed energizes the *cc* bus by the wire 121. A wire 122 in series with these two switches leads to the upper contacts 123 of the relay 108 and thence to the *o* bus, completing the circuits for counter-clockwise drive of the outer shutter to position #1.

Figure 11:
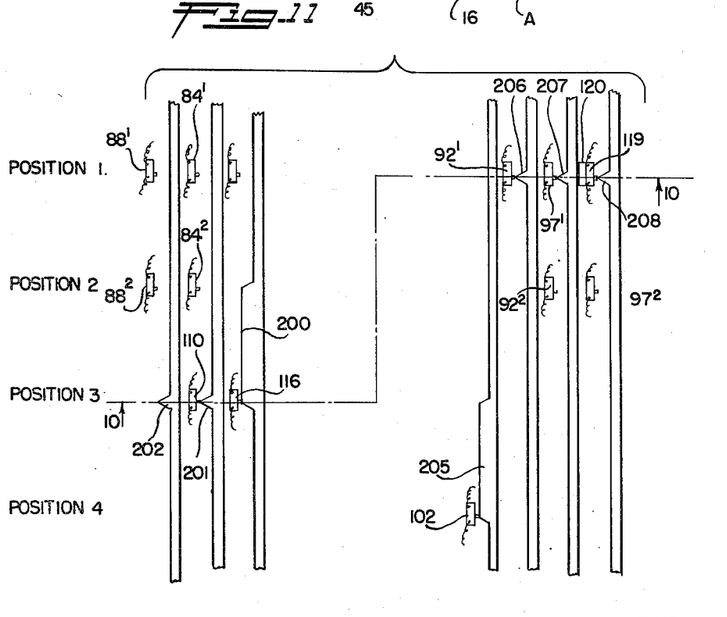
Figure 11 is a fragmentary developed and more or less diagrammatic view of the cam and switch arrangement.

The switches of the several firing and closing circuits above described are mechanically operated by cams carried by the inner and outer shutters. The switches may be mounted on the bulkhead ring 22 as shown in Figure 10 at points where the rollers 46 are omitted and the switches are operated by cams secured to the inner and outer shutters 19 and 20 at or adjacent their rings 45, as shown in Figures 3 and 10. Figure 11 illustrates the relationships between certain switches and their respective operating cams, it being apparent that any required number of cams and switches may be provided to fire the rocket salvos in the manner desired and to operate the shutters 19 and 20 accordingly. Referring now to Figure 11, the cams of the inner shutter 19 are shown in position #3 and those of the outer shutter 20 are shown in position #1. The inner shutter 19 has a cam 200 of substantial length for operating switch 116, a cam 201 operating switch 110 and a cam 202 for operating switches 88. The outer shutter 20 has a long cam 205 for operating switch 102, a cam 206 for operating switch 92′, a cam 207 operating switch 97′ and cams or a dual cam 208 operating switches 119 and 120. It will be observed that cams 200 and 205, which may be termed the direction cams, are of sufficient length to operate their respective switches through or between two or several positions while the other cams are short to operate their respective switches at given points or "on" positions only. As clearly shown in Figure 10, the cams may be provided in gangs or groups secured to the above described rings 45 while the switches may be mounted on brackets 220 secured to the bulkhead ring 17. It is believed that it will be apparent how the cams illustrated in Figures 10 and 11 operate the several switches to carry out the salvo sequencing and the shutter operations described in detail above.

The operation of the electrical circuits controlling the shutters have been described in connection therewith and the following description of the operation of the mechanism will include only a summary of the results obtained by these circuits.

When it is desired to load the rocket tubes 15 preparatory to a mission the dome 18, shutters 19 and 20, drum 21 and driving motor 49 can be pulled forward on the rods 25 and rollers 26 by releasing the hook 28, and be entirely removed by releasing the detent 29. With these parts removed the rockets 31 can be loaded in all the tubes at once by merely sliding them into place until the solenoid detent 35 engages to retain the rockets in position. Alternatively, the nose structure, above listed, can be left in place, and the service grounding switch 900 for the relays 65 opened to prevent actual rocket firing, whereupon the intervalvometer and shutter controls can be cycled through their entire movement to successively expose the different groups of rockets as the shutters are moved to their four firing positions.

With a load of rockets 31 in the tubes 15, the pilot or gunner will normally leave the master arming and shutter operating switches 72 and 71 in their open and shutter closing positions respectively until approaching the target. To get ready to fire, the arming switch 72 is closed and the shutter switch 71 is moved to the shutter opening position, which starts the intervalvometer arm 60 and also moves the inner shutter 19 to the #1 position, bringing its openings 49 into register with the openings on the outer shutter 20 already at this position. If the firing button 74 is closed when the shutters reach alignment then the first salvo is fired in two slightly separated groups. If the button 74 has not been closed, the intervalvometer arm 60 stops just short of the firing contacts 64′ of the first salvo, ready to be fired upon pressing the button 74.

If the button 74 is held closed, then the intervalvometer arm 60 continues to rotate clockwise, firing the remaining three salvos in sequence and finally returning to its starting point, closing the shutters during the last part of the sweep of the arm 60. However, if the button 74 is only momentarily closed with the shutters in register for any of positions 1, 2 and 3, then the salvo for that position will be fired and the intervalvometer arm 60 will continue to move to a position just short of firing the rockets in the next salvo, even though the button 74 has been released prior to completion of such movement of the arm 60. If less than all salvos have been fired, the pilot or gunner can shift switch 71 to the shutter closing position without affecting the intervalvometer and can later reopen this switch to return the shutters to whichever position the arm 60 is set for. During such shutter closing and opening movements, as well as in the case of shutter misalignment from any cause the firing circuits cannot be completed because the relays 65 remain unenergized until the shutters are in proper position relative to the salvo which the intervalvometer arm 60 is in position to fire. In the design of the specific embodiment of the invention chosen for illustrative purposes herein the shutter drive mechanism is geared to permit firing the four salvos in sequence in approximately two seconds. The intervalvometer drive and segment lengths are correspondingly timed, and the additional shutter opening and closing sequences bring the time for a complete revolution of the arm 60 to four seconds. It will be evident that the firing button 74 need not be manually actuated as radar responsive and computing gunsights are available for closing the firing circuit with greater accuracy than would normally be possible from pilot reactions.

It will be seen that I have invented improved multiple rocket installations normally contained within the envelope of the carrier thereof wherein rapid sequential discharge of multiple rocket salvos is possible, as well as single multiple rocket salvos at will. Further, the rockets are normally covered and protected from the weather, as well as eliminating the drag created by launching ends of rocket tubes exposed to the airstream.

Having described only a typical form of my invention I do not wish to be limited to the specific details herein set forth, but wish to reserve to myself any variations or modifications that fall within the scope of the following claims.

I claim as my invention:

1. An apparatus for launching multiple salvos of rockets spaced about the nose of a streamlined aircraft body, or the like, comprising a plurality of rocket launching tubes spaced in a plurality of concentric circles about the axis of said streamlined body and having exit ends for rocket discharge, a pair of coaxial independently rotatable shutters normally covering the exit ends of said launching tubes, said shutters having openings which, when aligned with each other and with certain of the launching tubes, permit the firing of the rockets from such launching tubes, and means for reversibly and separately driving said shutters to move said openings into and out of register, said driving means including means to move said shutters in unison when said openings are aligned to sequentially uncover other rocket launching tubes until all rockets have been fired.

2. Apparatus for launching rockets from an aircraft body comprising a plurality of spaced annular rows of rocket launching tubes, each tube having an exit end open for passing its respective rocket, said rows being concentrically spaced about the longitudinal axis of said body, a pair of rotatable shutters normally covering the exit ends of said tubes, each shutter being separately rotatable and having at least one opening and the shutters being relatively rotatable to positions where their openings are in register and aligned with certain of said tubes to permit the launching of rockets therefrom, and means for selectively turning said shutters to bring the registering openings in axial alignment with given tubes and to move said openings out of registration.

3. Apparatus for launching rockets from an aircraft body comprising a plurality of spaced annular rows of rocket launching tubes, said rows being concentrically spaced about the longitudinal axis of said body, each tube having an exit end open for passing its respective rocket, a pair of rotatable shutters normally covering the exit ends of said tubes, each shutter being separately rotatable and having at least one opening and the shutters being relatively rotatable to positions where their openings are in register and aligned with certain of said tubes to permit the launching of rockets therefrom, electric drive means for turning the individual shutters, and control circuit means for the drive means operable to actuate the same to turn the shutters in unison with their openings in register to permit firing of the rockets from given tubes and to turn the shutters to and from positions where their openings are out of registration to close said exit ends of said tubes.

4. In an aircraft having a body containing concentric rows of rocket launching tubes the combination of; a pair of nested annular shutters arranged at the forward end of said body and curved transversely to fair the same, means supporting each shutter for independent angular movement about the fore and aft axis of said body, said shutters having openings, and means for moving said shutters between positions where the openings are out of register to close the forward ends of said tubes and positions where the openings are in register and in axial alignment with certain of said tubes to permit firing of the rockets therefrom.

5. In an aircraft having a body containing at least one annular row of rocket tubes, the row being substantially concentric about the fore and aft axis of the body; the combination of a pair of nested annular shutters arranged at the forward end of the body and curved transversely toward said axis to form a streamlined fairing at the forward end of the body, the shutters having circumferentially spaced openings, means supporting each shutter for rotation about said axis, and means for rotating the shutters one relative to the other to move their openings between non-registering positions and positions where the openings register and are axially aligned with certain of said tubes and for thereafter moving the shutters in unison with the openings in register.

6. In an aircraft having a body containing at least one annular row of rocket tubes, the row being substantially concentric about the fore and aft axis of the body; the combination of a pair of nested annular shutters arranged at the forward end of the body and curved transversely forwardly and toward said axis to constitute a streamlined fairing for the forward end of the body, the shutters having openings spaced about said axis, and means supporting each of the shutters for independent rotation about said axis so that said openings may be moved into and out of register and into and out of axial alignment with said tubes.

7. In an aircraft having a body containing radially spaced annular rows of circumferentially spaced rocket launching tubes substantially concentric with the fore and aft axis of the body; the combination of a pair of nested annular shutters arranged at the forward end of the body in concentric relation to said axis and in front of said tubes, the shutters being curved forwardly and inwardly toward said axis to form a streamlined fairing for the forward end of the body, each shutter having circumferentially spaced openings arranged and proportioned to each be capable of registering with the end of a tube of each row of tubes, and means supporting each of the shutters for independent rotation so that their openings may be moved into and out of register and axial alignment with said tubes.

8. In an aircraft having a body containing radially spaced annular rows of circumferentially spaced rocket launching tubes substantially concentric with the fore and aft axis of the body; the combination of a pair of nested annular shutters arranged at the forward end of the body in concentric relation to said axis and in front of said tubes, the shutters being curved forwardly and inwardly toward said axis to form a streamlined fairing for the forward end of the body, each shutter having circumferentially spaced openings arranged and proportioned to each be capable of registering with the end of a tube of each row of tubes and to be completely out of register with one another, means supporting each shutter for independent rotation about said axis, and drive means for rotating the shutters to move their openings into and out of register and into and out of axial alignment with said tubes.

9. In an aircraft having a body containing radially spaced annular rows of circumferentially spaced rocket launching tubes substantially concentric with the fore and aft axis of the body; the combination of a pair of nested annular shutters arranged at the forward end of the body in concentric relation to said axis and in front of said tubes, the shutters being curved forwardly and inwardly toward said axis to form a streamlined fairing for the forward end of the body, each shutter having circumferentially spaced openings arranged and proportioned to each be capable of registering with an end of a tube of each row of tubes, means supporting each shutter for independent movement about said axis, drive means for moving the shutters, and a control for the drive means to cause movement of the shutters from positions where their openings are completely out of register to positions where their openings are in register and to then move the registering openings into successive axial alignment with the tubes.

10. In an aircraft having a body containing at least one annular row of rocket tubes, the row being substantially concentric about the fore and aft axis of the body; the combination of a pair of nested annular shutters arranged at the forward end of the body and curved transversely forwardly and inwardly toward said axis to form a streamlined fairing for the forward end of the body, the shutters having openings for passing rockets launched from the ends of said tubes, means supporting each shutter for independent rotation so that the shutters may be moved from positions where their openings are completely out of register to positions where the openings are in register and are axially aligned with said tubes including an annular track member on the forward end of one shutter, rollers carried by the body and cooperating with said track, and rollers on the forward end of the other shutter also cooperating with the track member, and means at the aft ends of the shutters for turning the same.

11. In an aircraft having a body containing at least one annular row of rocket tubes, the row being substantially concentric about the fore and aft axis of the body; the combination of a pair of nested annular shutters arranged at the forward end of the body and curved transversely forwardly and inwardly toward said axis to form a streamlined fairing for the forward end of the body, the shutters having openings for passing rockets launched from the ends of said tubes, means supporting each shutter for independent rotation so that the shutters may be moved between positions where said openings are completely out of register and positions where the openings are in direct registration to be successively axially aligned with said tubes upon rotation of the shutters in unison including an annular track member on the forward end of one shutter, rollers carried by the body and cooperating with said track, and rollers on the forward end of the other shutter also cooperating with the track member, and means at the aft ends of the shutters for turning each of the same including toothed rings on the shutter gears rotatably carried by the body to mesh with said rings, and motor means for driving the gears.

References Cited in the file of this patent

UNITED STATES PATENTS

| | | |
|---|---|---|
| 1,037,519 | Peacock | Sept. 3, 1912 |
| 1,908,726 | Beisel et al. | May 16, 1933 |
| 2,351,815 | Jensen | June 20, 1944 |
| 2,424,839 | Morton | July 29, 1947 |

FOREIGN PATENTS

| | | |
|---|---|---|
| 462,571 | France | Nov. 26, 1913 |
| 288,711 | Germany | July 3, 1919 |
| 924,013 | France | Mar. 3, 1947 |